US008743828B2

(12) United States Patent
Wang et al.

(10) Patent No.: US 8,743,828 B2
(45) Date of Patent: Jun. 3, 2014

(54) SYSTEMS AND METHODS FOR NON-OPTIMIZED HANDOFF

(75) Inventors: Jun Wang, San Diego, CA (US);
George Cherian, San Diego, CA (US);
Xipeng Zhu, Beijing (CN); Srinivasan Balasubramanian, San Diego, CA (US);
Anand Palanigounder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 87 days.

(21) Appl. No.: 13/297,208

(22) Filed: Nov. 15, 2011

(65) Prior Publication Data
US 2012/0127956 A1 May 24, 2012

Related U.S. Application Data

(60) Provisional application No. 61/414,365, filed on Nov. 16, 2010, provisional application No. 61/440,382, filed on Feb. 7, 2011.

(51) Int. Cl.
*H04W 36/00* (2009.01)
(52) U.S. Cl.
USPC .......................................... 370/331; 455/436
(58) Field of Classification Search
None
See application file for complete search history.

(56) References Cited

U.S. PATENT DOCUMENTS

2005/0025164 A1*  2/2005  Kavanagh et al. ............ 370/401
2006/0251022 A1* 11/2006  Zhang et al. .................. 370/331
2006/0258356 A1* 11/2006  Maxwell et al. ............... 455/436
2008/0089293 A1*  4/2008  Madour et al. ................. 370/331
2010/0322163 A1  12/2010  Bhalla et al.
2011/0051683 A1*  3/2011  Ramankutty et al. .......... 370/331
2011/0092213 A1   4/2011  Forsberg et al.
2011/0142239 A1   6/2011  Suh et al.
2011/0182268 A1*  7/2011  Akhtar .......................... 370/331
2011/0213897 A1   9/2011  Zhao et al.
2012/0188980 A1   7/2012  Wang et al.

FOREIGN PATENT DOCUMENTS

| WO | 2005008964 A1 | 1/2005 |
| WO | 2005027558 A1 | 3/2005 |
| WO | 2008020280 A1 | 2/2008 |
| WO | 2008044215 A2 | 4/2008 |
| WO | 2009135931 A1 | 11/2009 |

OTHER PUBLICATIONS

International Search Report and Written Opinion—PCT/US2011/061070—ISA/EPO—Jan. 30, 2012.

* cited by examiner

*Primary Examiner* — Chirag Shah
*Assistant Examiner* — Rina Pancholi
(74) *Attorney, Agent, or Firm* — Abdollah Katbab

(57) ABSTRACT

This disclosure provides systems, methods and apparatus for non-optimized handoffs for wireless communication. For example, the disclosure may be applied to enhance non-optimized handoff from a long-term evolution (LTE) network to an evolved high rate packet data (eHRPD) network. Systems, methods, and apparatus for reducing the interruption gap during handoffs from an LTE radio access network to an eHRPD network are also discussed. In one aspect, a method is provided for communicating information associated with a handoff of a wireless device from a source network to a target network. The method includes fetching a context for a device communicating via a first radio access system of a first network based in part on a unique identifier from a second radio access system of a second network.

36 Claims, 9 Drawing Sheets

SYSTEMS AND METHODS FOR NON-OPTIMIZED HANDOFF

CROSS-REFERENCE TO RELATED APPLICATIONS

This application claims priority from U.S. Provisional Patent Application No. 61/414,365, entitled "APPARATUS AND METHOD FOR ENHANCED NON OPTIMIZED HANDOVER," filed Nov. 16, 2010, which is incorporated by reference in its entirety. This application also claims priority from U.S. Provisional Patent Application No. 61/440,382, entitled "IMPROVED NON-OPTIMIZED HANDOFF FROM A FIRST NETWORK TO A SECOND NETWORK," filed Feb. 7, 2011, which is incorporated by reference in its entirety.

BACKGROUND

1. Field

The present application relates generally to communications, and more specifically to enhanced non-optimized handoffs from a long-term evolution (LTE) network to an evolved high rate packet data (eHRPD) network.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of enhanced non-optimized handoff in a wireless communication system. The method includes receiving a unique identifier associated with a device from the device operating on a first radio access system of a first network. The method further includes fetching a context for the device based in part on the unique identifier from a second radio access system of a second network. The method also includes generating a context for the device based on the context fetched from the second radio access system.

Another aspect of the subject matter described in the disclosure provides a wireless communication apparatus operative for enhanced non-optimized handoff in a wireless communication network. The apparatus includes a receiver. The receiver may be configured to receive a unique identifier associated with a device from the device operating on a first radio access system of a first network. The apparatus includes a context fetching circuit configured to fetch a context for the device based in part on the unique identifier from a second radio access system of a second network. The apparatus also includes a context generating circuit generating a context for the device based on the context fetched from the second radio access system.

In another aspect, an additional wireless communication apparatus operative for enhanced non-optimized handoff in a wireless communication network is provided. The apparatus includes means for receiving a unique identifier associated with a device from the device operating on a first radio access system of a first network. The apparatus includes means for fetching a context for the device based in part on the unique identifier from a second radio access system of a second network. The apparatus also includes means for generating a context for the device based on the context fetched from the second radio access system.

Another aspect of the subject matter described in the disclosure provides a computer program product, comprising a computer-readable medium. The computer-readable medium includes code for causing a computer to receive a unique identifier associated with a device from the device operating on a first radio access system of a first network. The computer-readable medium also includes code for causing a computer to code for causing a computer to fetch a context for the device based in part on the unique identifier from a second radio access system of a second network. The computer-readable medium further includes code for causing a computer to code for causing a computer to generate a context for the device based on the context fetched from the second radio access system.

In a further innovative aspect, another method of enhanced non-optimized handoff in a wireless communication system is provided. The method includes establishing a first context for a device with a first radio access system of a first network. The method also includes transmitting a unique identifier for the first context to a second radio access system of a second network, the unique identifier being associated with the device. The method further includes receiving a second context for the device with the second radio access system, the second context being based on the first context.

Another aspect of the subject matter described in the disclosure provides an additional wireless communication device operative for enhanced non-optimized handoff in a wireless communication network. The device includes a context establishment circuit configured to establish a first context for the device with a first radio access system of a first network. The device includes a transmitter configured to transmit a unique identifier for the first context to a second radio access system of a second network, the unique identifier being associated with the device. The device also includes a receiver configured to receive a second context for the device with the second radio access system, the second context being based on the first context.

A further innovative additional wireless communication device operative for enhanced non-optimized handoff in a wireless communication network is provided. The device includes means for establishing a first context for the device with a first radio access system of a first network. The device includes means for transmitting a unique identifier for the first context to a second radio access system of a second network, the unique identifier being associated with the device. The device also includes means for receiving a second context for the device with the second radio access system, the second context being based on the first context.

Another aspect of the disclosure provides another a computer program product, comprising a computer-readable medium. The computer-readable medium includes code for causing a computer to establish a first context for a device with a first radio access system of a first network. The computer-readable medium also includes code for causing a computer to transmit a unique identifier for the first context to a second radio access system of a second network, the unique identifier being associated with the device. The computer-readable medium further includes code for causing a computer to receive a second context for the device with the second radio access system, the second context being based on the first context.

Figure 1:
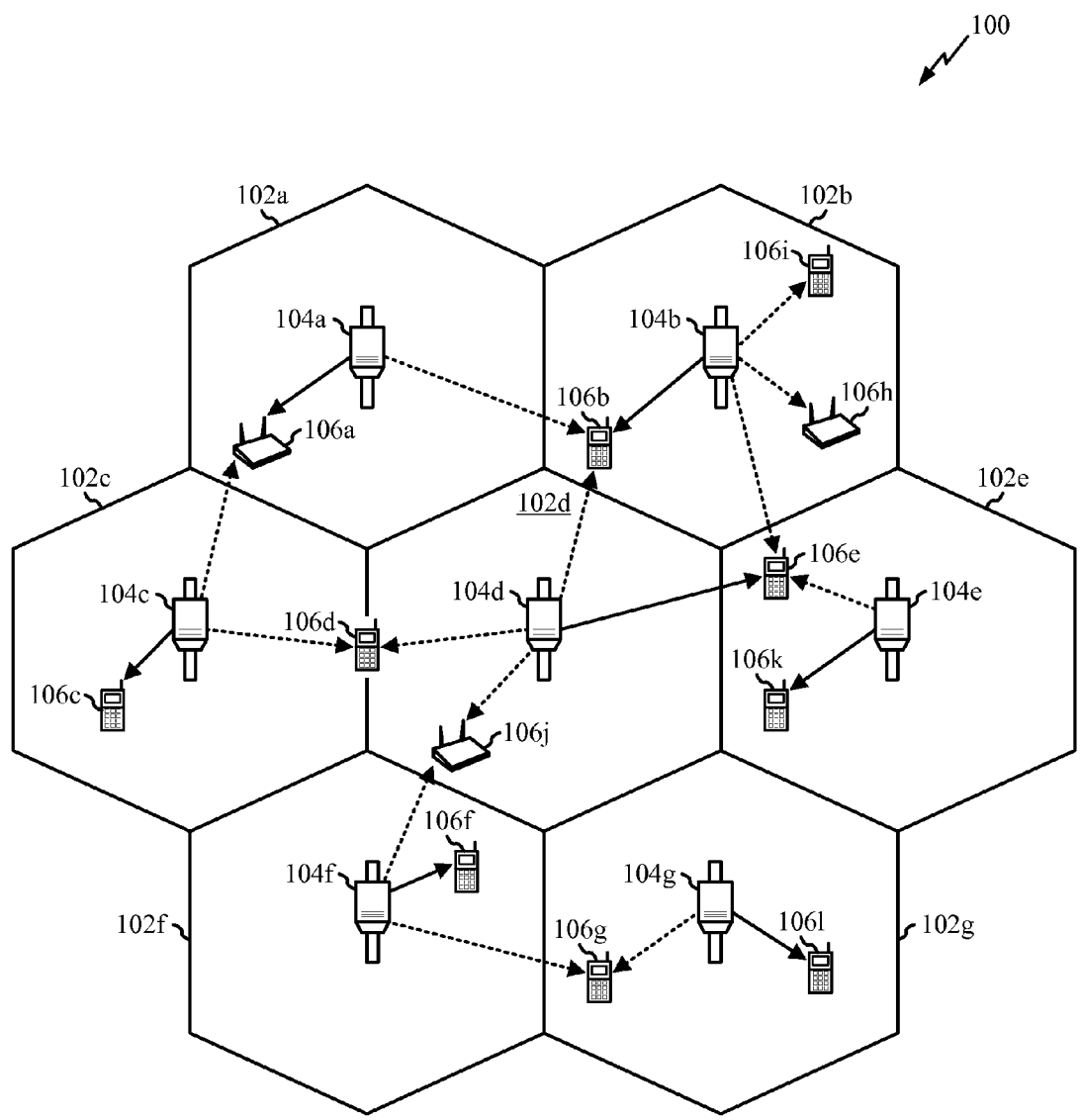
FIG. 1 shows an exemplary wireless communication network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Furthermore, in the following description, for reasons of conciseness and clarity, terminology associated with the Long Term Evolution (LTE) Evolved Universal Terrestrial Radio Access (E-UTRA) systems is used. The LTE E-UTRA technology is further described in the 3GPP TS 23.401: GPRS Enhancements for E-UTRAN Access (Release 8), which is hereby incorporated by reference in its entirety. It should be emphasized that the invention may also be applicable to other technologies, such as technologies and the associated standards related to Wideband Code Division Multiple Access (WCDMA), Time Division Multiple Access (TDMA), Orthogonal Frequency Division Multiple Access (OFDMA), Evolved High Rate Packet Data (eHRPD) and so forth. Terminologies associated with different technologies can vary. For example, depending on the technology considered, the User Equipment (UE) used in LTE can sometimes be called a mobile station, a user terminal, a subscriber unit, an access terminal, etc., to name just a few. Likewise, the Serving Gateway (SGW) used in LTE can sometimes be called a gateway, a HRPD serving gateway, and so forth. Likewise, the evolved Node B (eNB) used in LTE can sometimes be called an access node, an access point, a base station, a Node B, HRPD base station (BTS), and so forth. It should be noted here that different terminologies apply to different technologies when applicable.

Furthermore, in the following description, for reasons of conciseness and clarity, terminology associated with the evolved High Rate Packet Data (eHRPD) systems is also used. Aspects associated with networking between E-UTRAN and eHRPD are further described in the 3GPP2 X.P0057: E-UTRAN—eHRPD Connectivity and Interworking: Core Network Aspects, which is hereby incorporated by reference in its entirety. It should be emphasized that the invention may also be applicable to other technologies as previously described.

FIG. 1 shows an exemplary wireless communication network. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one implementation, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

Figure 2:
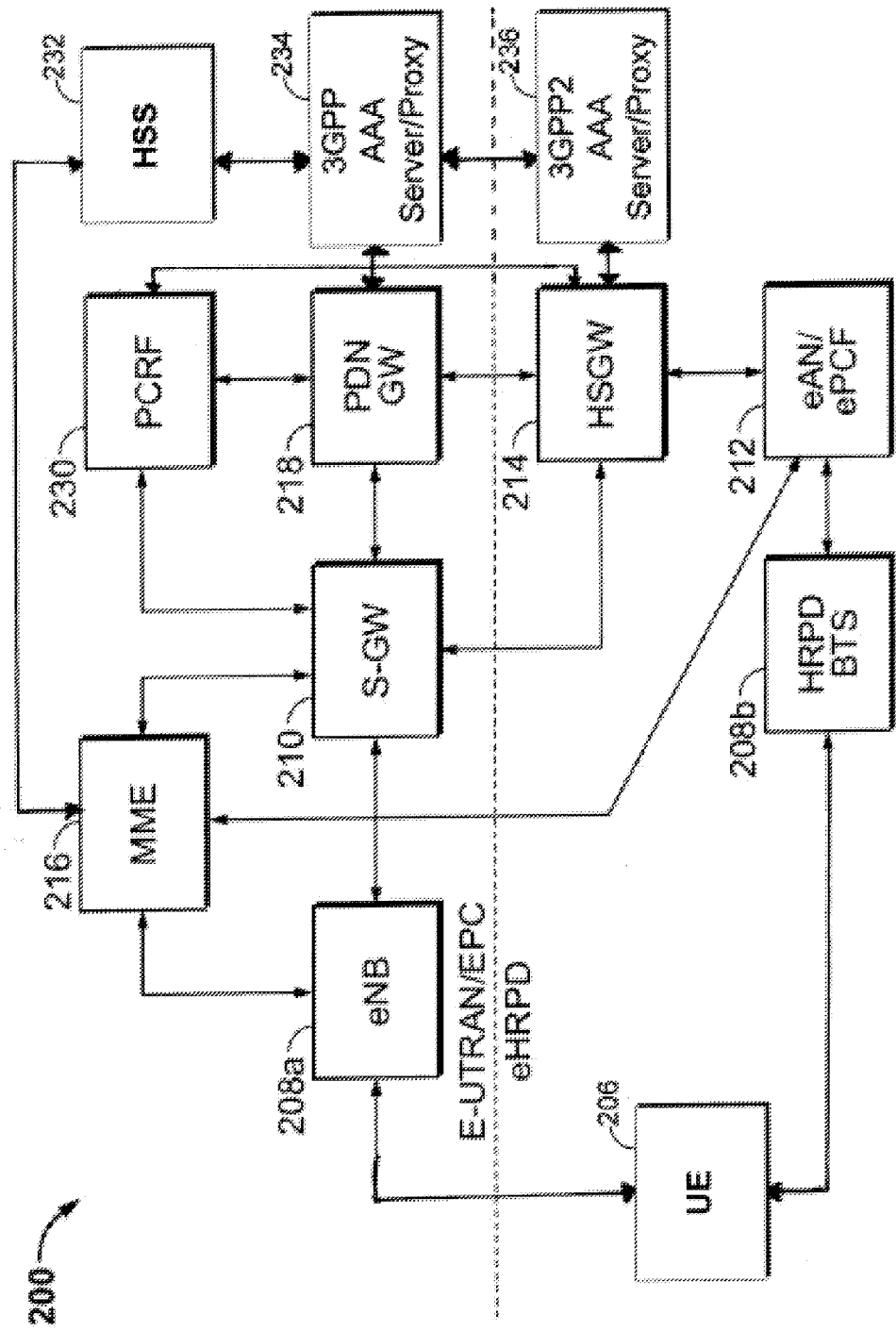
FIG. 2 shows an example of a functional block diagram of certain communication entities of the communications network of FIG. 1 in accordance with various aspects.

FIG. 2 shows an example of a functional block diagram of certain communication entities of the communications network of FIG. 1 in accordance with various aspects. The components shown in FIG. 2 illustrate a system in which a multimode device may communicate using multiple radio access technologies (RATs), for example either an eHRPD network or an LTE network, depending on the configuration of the network in the location in which the mobile device is currently operating. As FIG. 2 illustrates, the system 200 may include a radio access network RAN that provides wireless radio communications between a UE 206 and an evolved NodeB (eNB) 208a (e.g., a base station, access point, etc.) using LTE radio access technology. The system also depicts a RAN which provides wireless radio communications between a UE 206 and a HRPD base transceiver station (BTS) 210 (e.g., a base station, access point etc.) using eHRPD radio access technology. For simplicity of discussion, FIG. 2 depicts a UE 206 and one eNB 208a in a RAN and one HRPD BTS 208b in another RAN; however, it is to be appreciated that each RAN may include any number of UEs and/or eNBs/HRPD BTSs. In accordance with one aspect, the eNB 208a and HRPD BTS 208b may transmit information to a UE 206 over a forward link or downlink channel and a UE 206 can transmit information to the eNB 208a and HRPD BTS 209b over a reverse link or uplink channel. As shown, RANs can utilize any suitable type of radio access technology such as, but not limited to, LTE, LTE-A, HSPA, CDMA, high rate packet data (HRPD), evolved HRPD (eHRPD), CDMA2000, GSM, GPRS, enhanced data rate for GSM evolution (EDGE), UMTS, or the like.

The RANs, and specifically the eNB 208a and HRPD BTS 208b, can communicate with a core network that enables charging (e.g., usage charges for services, etc.), security (e.g., ciphering and integrity protection), subscriber management, mobility management, bearer management, QoS handling, policy control of data flows, and/or interconnections with external networks 220. The RANs and core network can communicate via an S1 interface, for instance. The core network can include a mobility management entity (MME) 216 that can be an end-point for control signaling from the RAN 210. The MME 216 can provide functions such as mobility management (e.g., tracking), authentication, and security. The MME 216 can communicate with the RANs via the S1 interface. The core network can also include a serving gateway (S-GW) 210 which is a user plane node that connects the core network to the LTE RAN. The core network may also include a HRPD serving gateway (HSGW) 214 which connects the core network to the eHRPD RAN. The eHRPD RAN also includes an evolved access node (eAN) and an evolved packet control function (ePCF) entity 212 which manages the relay of packets between the HRPD BTS 208b and the HSGW 214. In an aspect, the MME 216 can communicate with the S-GW 210 or the eAN/ePCF 212 via an S11 interface. Furthermore, the HSGW 210 and the S-GW 214 may communicate to facilitate interoperability between the eHRPD network and the EPC. In another aspect, the MME 216 and S-GW 210 can be configured as a single node to provide a single end-point for user and control signaling originating from a RAN and/or terminating at a RAN. The network may also include a policy and charging rules function (PCRF) 230. The PCRF 230 may communicate with the S-GW 210, the HSGW 214, the PDN GW 218 and the core network 220.

The core network can also include a packet data network (PDN) gateway (GW) 218 that facilitates communications between the core network (and the RANs) and external networks. The PDN GW 218 can provide packet filtering, QoS policing, charging, IP address allocation, and routing of traffic to external networks. In an example, the S-GW 210 and the PDN GW 218 can communicate via an S5 interface. While illustrated as separate nodes in FIG. 2, it is to be appreciated that the S-GW 210 and PDN GW 218, for example, can be configured to operate as a single network node to reduce user plane nodes in core network 220. In one aspect, the core network may also include a 3GPP authentication, authorization and accounting (AAA) server/proxy 234 and a 3GPP2 AAA server/proxy 236 which many communicate with each other and further communicate with the PDN-GW 218 and the HSGW 214 respectfully. The core network may also include a home subscriber services (HSS) entity 232 which may communicate with the MME 216 and the 3GPP AAA server/proxy 234.

The core network can communicate with external networks via the PDN GW 218. The external networks, not shown, can include networks such as, but not limited to, a public switched telephone network (PSTN), an IP multimedia subsystem (IMS), and/or an IP network. The IP network can be the Internet, a local area network, a wide area network, an intranet, or the like. It should be appreciated that configuration shown in FIG. 2 is an example of just one possible configuration and many other configurations and additional components may be used in accordance with various aspects and implementations described below.

Figure 3:
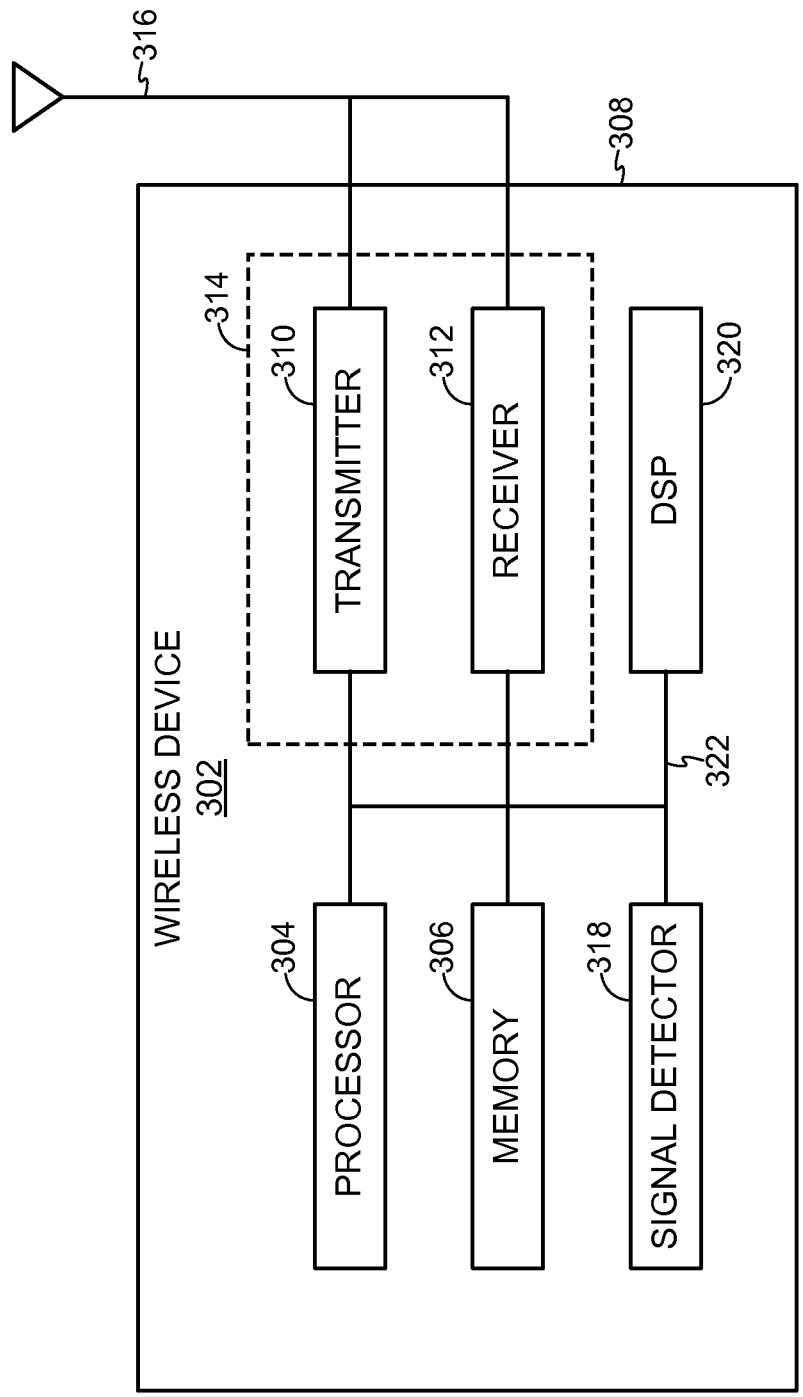
FIG. 3 shows an example of a functional block diagram of an exemplary user equipment (UE) shown in FIG. 2.

FIG. 3 shows an example of a functional block diagram of an exemplary user equipment (UE) shown in FIG. 2. The wireless device 302 may be multimode, capable of operating using different radio access technologies (RATs) such as using LTE or eHRPD. The device 302 is an example of a device that may be configured to implement the various methods described herein. The wireless device 302 may implement any of the devices illustrated in FIGS. 1-2.

The device 302 may include a processor 304 which controls the operation of the device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The device 302 may also include a housing 308 that may include a transmitter 310 and a receiver 312 to allow transmission and reception of data or instructions, for example wirelessly and/or over one of many known interfaces. The transmitter 310 and receiver 312 may be combined into a transceiver 314. In some aspects, a single or a plurality of transmit antennas may be attached to the housing 308 and electrically coupled to the transceiver 314. For example, when the device 302 is used to implement a UE or AT 106a, or an AP 104a or eNB 208a or HRPD BTS 208b, the device 302 may comprise one or more antennas. The device 302 may also include (not shown) multiple transmitters, multiple receivers, and/or multiple transceivers.

In some aspects, the device 302 also includes a signal detector 318 that may be used in an effort to detect and quantify the level of signals received by the transceiver 314. The signal detector 318 may detect such signals as total energy, energy per subcarrier per symbol, power spectral density and other signals.

The device 302 may also include a digital signal processor (DSP) 320 for use in processing signals.

The various components of the device 302 may be coupled together by a bus system 322, which may include a power bus, a control signal bus, and a status signal bus in addition to a data bus. The device 302 may further include other components or elements as will be understood by those having ordinary skill in the art.

Although described separately, it is to be appreciated that functional blocks described with respect to the device 302 need not be separate structural elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the UE 206a may also be implemented as a combination of computing devices, e.g., a combination of a DSP and a microprocessor, a plurality of microprocessors, one or more microprocessor in conjunction with a DSP communication, or any other such configuration.

As a UE 206 moves throughout a network, the UE 206 may be required to perform a handoff from a part of the network using one radio access technology (RAT) to another part of the network using another RAT. For example, as shown in FIG. 2, a multimode UE 206 may be configured to transition from a network using LTE radio access technology to another part of the network using eHRPD radio access technology. A handoff may refer to a process of transferring an ongoing call or data session from one channel coupled to a network to another channel. The channel may be on the same network or coupled to a different network than the current channel. The term "handover" may also be used to refer to a handoff. When performing a handoff, the UE 206 and the target network may exchange a variety of signaling and perform various operations to establish a new session and configure the traffic channel for sending and receiving data on the target network. Preferably, no interruption in service should occur during the handoff.

In one aspect, the handoff may be "optimized" to reduce the interruption that may occur due to the time needed for the signaling required to establish a connection to the target network. For example, an interface, such as an S101 interface, may be used to allow a UE 206 to establish and maintain an eHRPD radio session and HSGW 214 context. In other words, an "optimized" handoff may allow for pre-establishment and maintenance of eHRPD and PPP context while the UE 206 is active on the LTE RAN. During an active handoff, traffic channel assignment procedures may be executed through a tunnel defined by the interface. "Optimized" handoffs may reduce the interruption gap for transmitting data, for example, to less than 300 milliseconds, which may be short enough to allow a seamless voice over IP (VoIP) transfer.

In another aspect, the handoff may be "non-optimized." A "non-optimized" handoff may apply in two different circumstances. In one scenario, when a UE 206 transitions between one RAT to another, the UE 206 may have no information (context) about the target network to use when performing the handoff. For example, a UE 206 may first establish a connection to a LTE RAN and later transition to an eHRPD RAN for which it has not previously established a connection. In this scenario, tasks such as establishing an eHRPD radio session, performing eHRPD pilot acquisition and overhead update, and various other operations, as will be described below, may be performed during the handoff. In this scenario, a significant interruption gap may result as the various signals are exchanged and operations are completed.

In another scenario, a handoff may be to a target network, such as an eHRPD RAN, for which a partial context exists. For example, a UE 206 may first establish a connection to an eHRPD RAN and later transition to an LTE RAN. When the UE 206 establishes a new session with the LTE, the UE 206 and the eHRPD network may save or retain certain information regarding the context established with the eHRPD RAN. Later, if the UE 206 transitions to the original eHRPD RAN, the UE 206 and eHRPD network may use the information (i.e., the partial context) to establish a new session and configure the traffic channel, etc.

In general, to begin exchanging data with the target RAN, such as an eHRPD RAN, both a new radio session and a new PPP context may be established for the handoff to be completed. Establishing the PPP context with an eHRPD RAN may further include, among other tasks, establishing a link control protocol (LCP) context, an authorization context (e.g., using extensible authentication protocol for authentication and key agreement (EAP-AKA)), a vendor specific network control protocol (VSNCP) context, and a QoS context. If the partial context described above already exists, the radio session, the LCP context and the authorization context may be configured through use of the partial context and may not have to be fully performed, if at all, during a handoff. While this may reduce the interruption that may occur during a handoff, the VSNCP context may still have to be established during the handoff procedure. The time needed to establish the VSNCP context may still result in an undesirable interruption gap causing significant disruptions to traffic flows.

In another aspect, the certain optimizations may introduce complexity to the UE 206. For example, the requirement to choose eHRPD after LTE acquisition requires modifications to procedures (e.g., Multimode System Selection (MMSS) procedures). This may include specific workarounds in the device to enable this proposal. LTE data may need to be suspended before transitioning to eHRPD to create the eHRPD session and partial context. Also, maintaining the context over eHRPD can impact the battery life of the device. For example, additional or redundant HRPD session maintenance when the UE is in deep LTE coverage and the eNodeB sends eHRPD neighbor information may consume battery resources. The partial PPP context may be maintained. This may be unnecessary until the UE 206 needs to transition from LTE to eHRPD, which happens, for example, the border of the LTE networks.

In one implementation, a context may be transferred from a mobility management entity (MME) during device handoff from an originating network to a target network. During operation with the originating network, certain information identifying the context for the device may be exchanged. By providing elements of this information to the target network during handoff, the target network may be configured to retrieve the context from the originating network.

For example, when a UE 206 performs a handoff to eHRPD from LTE, the UE 206 may be configured to provide one or more of the following information elements to the HSGW of the target network: globally unique temporary identity (GUTI), a simplified tracking area update (TAU) request with mandatory fields required by the old MME, or an old TAU request. The HSGW, serving as a new MME or a serving as GPRS support node (SGSN), may be configured to fetch the authentication context from an MME associated with the originating network. The information may be included in a vendor specific network control protocol such as those described below.

In some implementations, backhaul signaling may be used by the HSGW to transmit a request signal including the context identifying information to the LTE system. In response, the eHRPD may receive context information for the device. The context request may include one or more of: an international mobile subscriber identity (IMSI), a globally unique temporary identity (GUTI), a radio access technology (RAT) type (set to LTE or UMTS), a complete TAU request message, an indication (may be used to bypass TAU request integrity check), a target public land mobile network (PLMN) identifier (set to the HSGW mobile country code (MCC) and mobile network code (MNC)).

The HSGW and UE may use key access security management entries (KASME) as a master session key (MSK). In some implementations, the HSGW 214 and UE 206 may derive a MSK from KASME. For example, may use KASME and LCP Configure Request identification and KASME to drive a MSK. When the UE 206 is in the connected mode, HSGW may perform re-authentication if needed, which is not in the critical path for setting up the context. Accordingly, a context for the device is retrieved from the originating network rather than reconstructed anew. This approach reduces the time needed to establish a context during handoff.

Figure 4A:
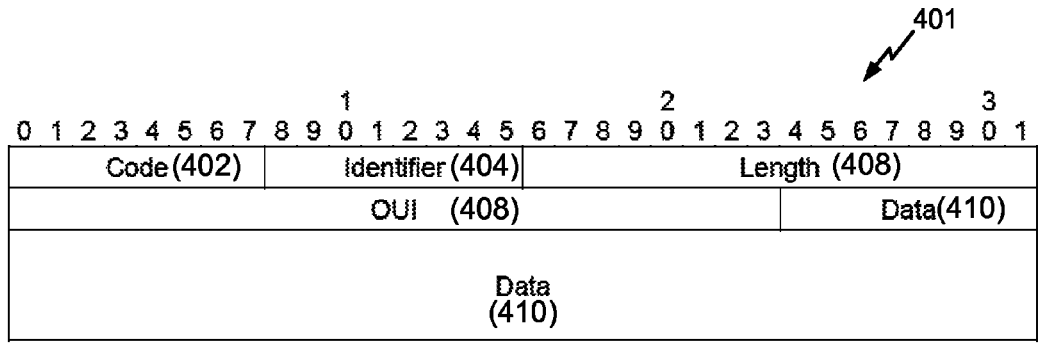
FIG. 4A shows an example of a VNSCP message format.

FIG. 4A shows an example of a VSNCP message format. As described above, reducing the size of the VSNCP signaling data packets (e.g., reducing the number of octets required) may facilitate sending the VSNCP configuration-request over a signaling channel and may provide other processing advantages for reducing the interruption gap during a handoff. Various aspects associated a VSNCP packet are further described in RFC 3772 entitled Point-to-Point Protocol (PPP) Vendor Protocol, which is hereby incorporated by reference in its entirety. Furthermore, various aspects associated with the VSNCP packet are also described in RFC 1661 entitled The Point-to-Point Protocol (PPP), which is also hereby incorporated by reference in its entirety. The VSNCP packet may include a one octet code field 402 which may be used to identify the type of control packet. The code field 402 may be configured to use seven different codes which may include VSNCP configure-request, configure-ack, configure-nak, configure-reject, terminate-request, terminate-ack, and code-reject codes. In one aspect, the configure-nak code may not be used and any message sent with this code can result in a code-reject message being sent in response. The VSNCP packet may further include a one octet identifier field 404 which may be used to for matching requests and replies. The VSNCP packet may also include a two octet length field 406 used to indicate the total length of the packet including the code, identifier, length and data fields. The VSNCP packet may also include a three octet vendor organizationally unique identifier (OUI) 408 field to identify a specific vendor. As depicted in FIG. 4A, the rest of the message is allocated for sending data 410 as will be further described below.

When sending a VSNCP configure-request message for a handoff attach, the message includes a number of configuration options sent in the data field 410. Table 1, included below, provides a list of various configuration options that may be sent in one implementation of a 3GPP2 VSNCP.

TABLE 1

| Configuration Option | Type (decimal) | Configuration Option Length (octets) | Value |
|---|---|---|---|
| PDN Identifier | 01 | 3 | PDN Identifier is a 1 octet identifier selected by the UE for a PDN. Valid values are from 0 to 14. The value 15 is reserved for future use. This option shall be present as the first configuration option in all 3GPP2 VSNCP packets. |
| Access point name | 02 | 2-102 | Value field of the Access Point Name IE. |
| PDN Type | 03 | 3 | Valid values are<br>1—IPv4<br>2—IPv6<br>3—IPv4/IPv6<br>Value portion of the PDN Type IE. |
| PDN address | 04 | 3-15 | Value portion of the "PDN Address" IE. The VSNCP Configure-Request message sent by the UE for initial attach to an APN, the PDN type field of the PDN Address option shall be set to '000' and the Length field of the PDN Address option set to 3, with no IPv4 or IPv6 address information included. |
| Protocol configuration options | 05 | 3-253 | Value portion of the Protocol Configuration option value. |
| Attach Type | 07 | 3 | Valid values are<br>1—"Initial Attach" to a PDN,<br>3—"Handover" attach to a PDN. |
| IPv4 Default Router Address | 08 | 6 | Encoded a 4-octet IPv4 address. Includes IPv4 Default Router address assigned by PDN gateway for the PDN. |
| IPv6 HSGW Link Local Address IID | 11 | 10 | Encoded as an 8-octet IPv6 interface identifier of the HSGW link local address. |
| User Context Identifier | 12 | 3 | User Context Identifier is a 4-bit identifier selected by the UE for each of the PDN connections to the same APN. Valid values are from 0 to 14. The value 15 is reserved for future use. |
| Emergency Indicator | 13 | 3 | Valid values are<br>1—"emergency services request"<br>0—"non-emergency services request"<br>The absence of this configuration option implies "non-emergency services request" |
| VSNP Extend Code Support | 15 | 3 | Indication whether the sender supports sending the VSNP Extend Code.<br>Valid values are |

TABLE 1-continued

| Configuration Option | Type (decimal) | Configuration Option Length (octets) | Value |
|---|---|---|---|
| | | | 0—Sender does not support VSNP Extend Code, 1—Sender supports VSNP Extend Code. The absence of this configuration option implies that the VSNP Extend Code capability is not supported. |
| Compression Parameters | 16 | >=4 | This option indicates the protocol types supported by the sender. Allowed IP-Compression-protocol types are: 0x0003—ROHC over PPP. Coding of the specific parameters shall follow Robust Header Compression (ROHC) Option, except for Type, Length and IP-Compression-Protocol fields. Other values are reserved. This configuration option may only be included in a message if the VSNP Extend Code Support option is also included and set to the value 1. Multiple instances of this option may occur in the same message, but may not contain the same protocol type. |
| Default APN Indication | 17 | 3 | Valid values are: 0—"The requested APN is not the default APN" 1—"The requested APN is the default APN" |

Table 1 represents an example and other variations are contemplated as within the scope of the disclosure. In some implementations, the configuration option names may vary, the type may be represented by non-decimal values (e.g., integers) and may be non-consecutive, the length may vary, and/or the valid values may include more values or fewer values than shown. For example, in some implementations, it may be desirable to have an attach type of 5 octets and the valid values ranging from 1 to 6.

As seen in Table 1, the configuration options may occupy a large number of octets in the VSNCP configure-request message which may contribute to increasing the interruption gap during the handoff and make it difficult to transmit the VNSCP configure-request message on a signaling channel. Rather than sending the multiple configuration options described above, a single configuration option may be provided which may leverage common information between the configurations of the source and target networks. For example, many of the configuration options may be obtained by a target eHRPD network communicating with a source LTE network, as many of the capabilities of the two networks may be in common.

Figure 4B:
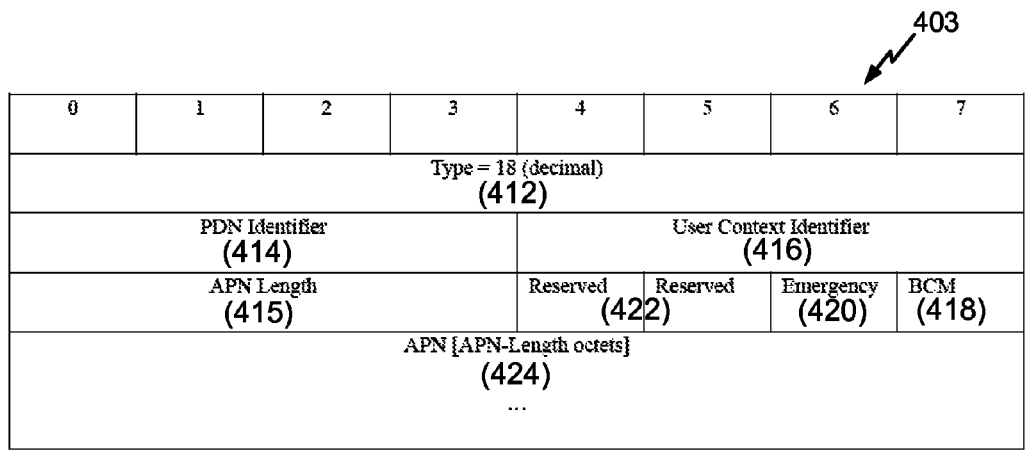
FIG. 4B shows an example of another VNSCP message format.

FIG. 4B shows an example of a single configuration option that might be used according to various implementations in place of the configuration options described above in Table 1. The new configuration option 403 may be described as a fast handoff attach configuration option. The new configuration option data may encapsulate necessary data from the configuration options described in Table 1 above to provide the HSGW 214 in eHRPD network with enough information to enable the HSGW 214 to obtain or derive the full set of configuration options needed to establish a connection with the PDN gateway. The configuration option 403 may be identified by a one octet type field 412 which indicates the configuration option type being used. The configuration option type may be set to the decimal value 18 so as to avoid overlapping with the currently defined configuration option types.

The configuration option 403 may include a four bit PDN identifier field 414. As valid values for this field may be defined to be between 0-14, only four bits may be necessary. As several configuration options are encapsulated into the fast attach configuration option, the type and length fields required by the configuration options in Table 1 may be omitted. For example, the PDN identifier field may normally require 3 octets, 2 of which may be occupied by the type of configuration option and the length fields. In contrast, the configuration option 403 allows for using the just four bit PDN-ID value along with other configuration options. The configuration option 403 may further include a four bit user context identifier field 416 to allow identification of multiple PDN connections. The configuration option 403 also includes a four bit APN length field 415 which may be used to specify the number of octets required by the APN field 424. The configuration option 403 may further include a one bit bearer control module field 418 which may be used to determine what type of quality of service (QoS) capability the network may support such as either network-initiated QoS or UE-initiated QoS. Furthermore, a one bit emergency field 420 may be provided for determining whether there is an emergency services request. Two reserved fields 422 may also be included.

In addition, the APN field 424 is also included in the configuration option 403 message which is used to identify the packet data network (PDN) for which the UE wishes to connect. As described in Table 1, the APN may be defined for requiring a total of 100 octets. According to one implementation provided herein, the length of the APN field 424 may be limited to 16 octets (for which is the maximum value the four bit APN length field 415 may specify). This helps to ensure that the maximum number of octets required by the configuration option 403 remains small enough for efficient transmission and processing of the message. Furthermore, by using the APN-length field 434, the number of octets in the APN field 424 may vary and may allow for a reduced number of octets required for the configuration option 403 when the APN uses fewer than 16 octets.

By using the configuration option 403 described in FIG. 4B, the remaining configuration options may not be sent.

When the HSGW 214 receives the VNSCP message with the configuration option 403, the HSGW can use the common information retained using the partial context or retrieved from the LTE network to convert the reduced message into a format needed to communicate with the PDN-GW 218. By using common information between the LTE network and the eHRPD networks and encapsulating/reducing the configuration option data into the configuration option 403, the total number of bytes required for the VSNCP configuration-request message is significantly reduced. As shown in FIG. 4B, the total size of the VSNCP configuration-request message 401 can be a maximum of 26 bytes including seven bytes for the VSCNP message format header field shown in FIG. 4A along with the 3 bytes of the configuration options without the APN field 424, along with a maximum of 16 bytes for the APN field 424. By using the reduced-size configuration-request message described in FIGS. 4A and 4B, the interruption gap may be significantly reduced as the time needed for the VSNCP context to be established may be accomplished without adding extra time beyond what is required for traffic channel establishment.

Figure 4C:
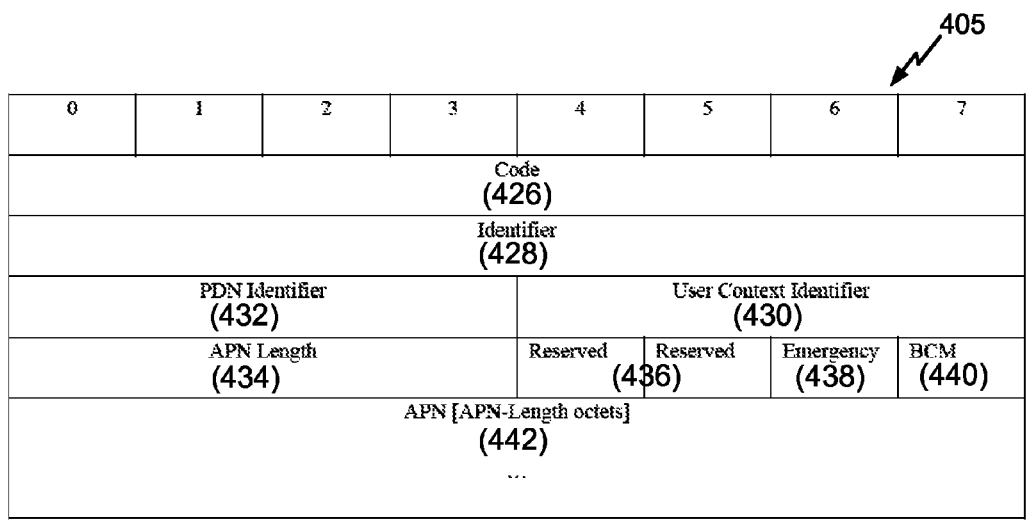
FIG. 4C shows an example of another VNSCP message format.

FIG. 4C shows an example of a VSNCP packet data format according to another implementation. As described above, seven codes may be defined for the code field 426 used to identify the type of control packet. According to one implementation, an eighth code may be added to define an additional VSNCP control message 405 apart from the configuration-request message. This configuration message 405 may be described as a fast-handoff-request message. The message format may then defined independently from the format required by the configuration-request message and therefore may not have to specify the configuration option type field 412 shown in FIG. 4B. As a result, some of the fields shown in FIG. 4B may be included in the fast-handoff-request message with the omission of the one octet type field 412. Furthermore, the three octet OUI field 408 may also be omitted from the VSNCP data message format 405. Consequently, the total number of bytes for the VSNCP data message format 405 could be reduced to four bytes for the VSNCP packet header and configuration options along with a maximum of 16 bytes for the APN field 442 for a total maximum of 20 bytes.

In the message format described in FIG. 4B, the APN field 424 occupies a large portion of the total bytes required by the message format 403, as at a maximum, the APN field 424 could contain up to 16 bytes. According to another implementation, to eliminate the need for the APN field 424, the pre-registration phase described above with reference to FIG. 4 may be modified so as to pre-configure the APNs. More specifically, a mapping between APNs and PDN-IDs may be sent from the UE 206 to the HSGW 214. The mapping may be deleted after the handoff occurs. The handoff as described above with reference to FIG. 6 may then be performed, but without including the APN field 424 and the APN-length field 415 as will be described in further detail below.

Figure 5:
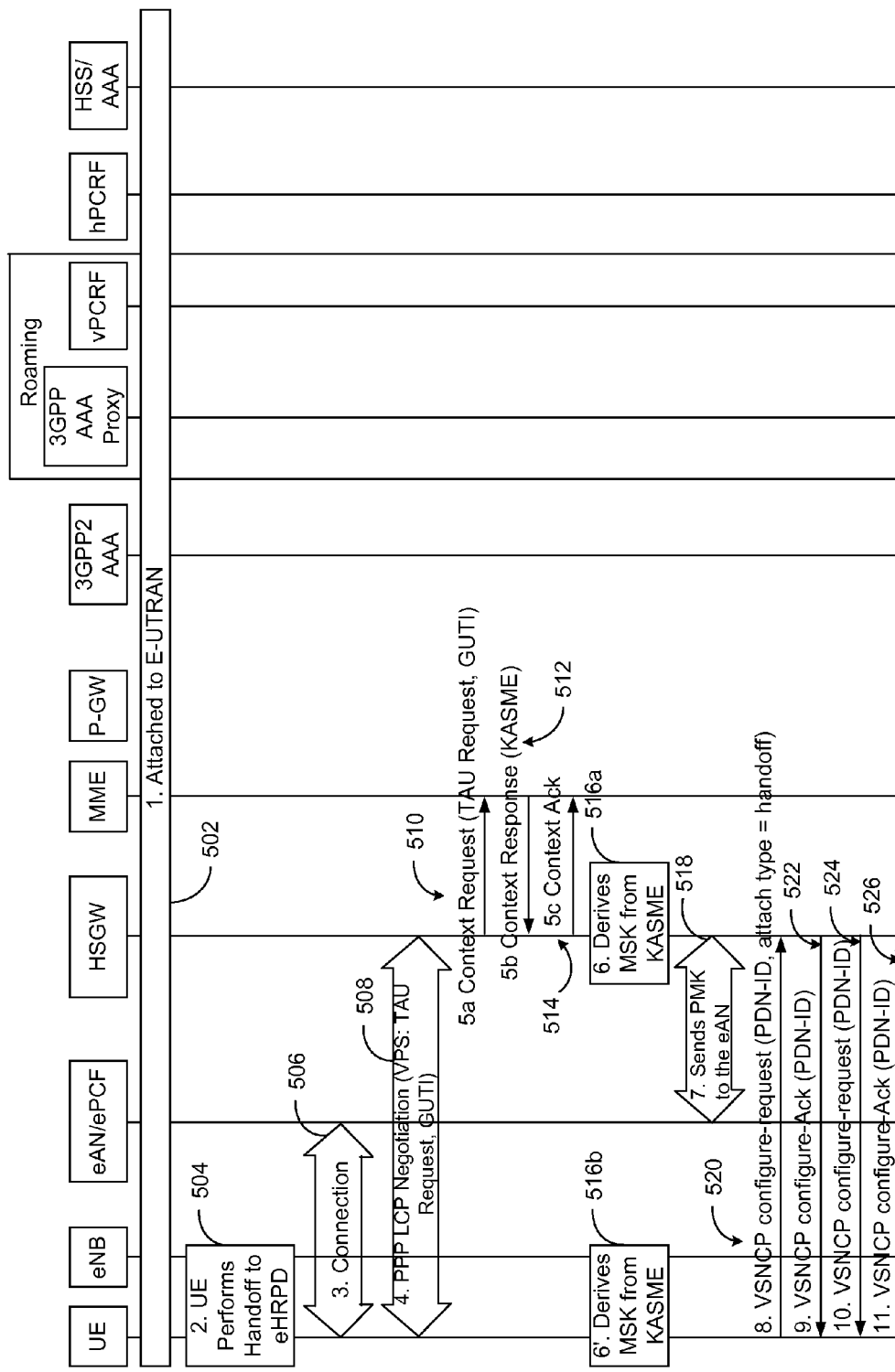
FIG. 5 illustrates an example of a context transferred based call flow diagram.

FIG. 5 illustrates an example of a context transferred based call flow diagram. In the example shown in FIG. 5, the handoff will be performed from LTE to eHRPD. At 502, the device is attached to an e-UTRAN (e.g., LTE). As such, the UE 206 may have an active context with the LTE. The UE 206 determines a handoff may be needed to an eHRPD at block 504. The UE 206 may connect with the eAN/ePCF 212 at block 506. The connection may include eHRPD session establishment and device authentication (e.g., using A12 authentication). This may be followed by an A10 connection setup with the HSGW 214. During the PPP LCP negotiation, the UE 206 may send message 508 containing one or more vendor specific parameters (VSPs) to the HSGW 214. The vendor specific parameter may include information that can be used to identify the context on the LTE system, such as globally unique temporary identity (GUTI), a simplified tracking area update (TAU) request with mandatory fields required by the old MME, or an old TAU request.

Based in part on the VSP information, the HSGW may generate a context request message 510. The context request, as discussed above, may include one or more of international mobile subscriber identity (IMSI), globally unique temporary identity (GUTI), radio access technology (RAT) type (set to LTE or UMTS), complete TAU request message, Indication (may be used to bypass TAU request integrity check), Target Public Land Mobile Network (PLMN) identifier (set to HSGW mobile country code (MCC) and mobile network code (MNC)).

The old MME may transmit a context response 512. The context response 512 may include key access security management entries (KASME) for the context. In some implementations, the HSGW 214 may be configured to transmit a context acknowledgement message to the old MME. The acknowledgment may be used to signal the handoff of the context from the old MME to the HSGW 214.

At 516a and 516b, the UE 206 and the HSGW 214 may derive the master session key (MSK) from the KASME. This key may be used to secure the communication between the UE 206 and the HSGW 214. The HSGW 214 may transmit a pairwise master key (PMK) to the eAN/ePCF 212 at block 518. The pathway between the UE 206 and the HSGW 214 may now be used to establish a connection with a packet data network. The UE 206 may transmit a configure request message 520 including the packet data network identifier and an attach type. In the example shown, the attach type is "handoff." The HSGW 214 may transmit an acknowledgement message 522. At this point, the UE 206 may have completed the handoff and be prepared to being further configurations to communicate with the HSGW 214. The configuration request message 524 transmitted from the HSGW 214 to the UE 206 may include parameters (e.g., QoS, policy, sequence identifier) that the UE 206 may utilize when communicating with the HSGW 214. The UE 206 may acknowledge receipt of the configuration request message 524 by transmitting a configuration acknowledgement 526.

Figure 6A:
FIG. 6 shows an example illustrating a configuration request message format.
Figure 6B:
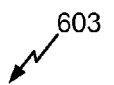

FIG. 6 shows an example illustrating a configuration request message format. FIGS. 6A and 6B show examples of the modified VNSCP packet data formats for use with the pre-registration phase, such as that shown in FIG. 5. FIG. 6A depicts a single configuration option 602 to be used in place of the configuration options described in Table 1 and as similarly shown in FIG. 4B. In FIG. 6A, the APN length field and APN field are omitted. As a result, in the implementation shown, the total number of bytes required can be nine bytes which includes the seven bytes required for the VSCNP message format headers and two bytes for the type field 602 specifying the new configuration option 601 and the other fields as described with reference to FIG. 4B. FIG. 6B corresponds to FIG. 4C which defines an eighth code to identify an additionally provided VSNCP fast-handoff-request message which allows the elimination of the type field 602 and the OUI field 408. In FIG. 6B, the APN field and the APN-length field may also be omitted in conjunction with the pre-registration phase shown in FIG. 5. As a result, the VSNCP message format required can be a total of three bytes as shown in FIG. 6B.

Figure 7:
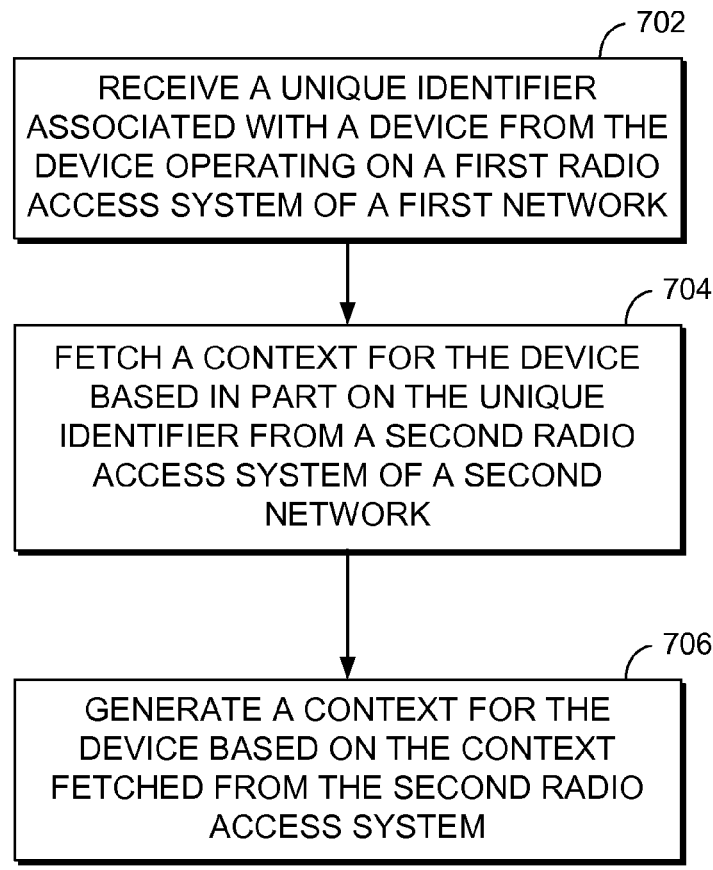
FIG. 7 shows an example illustrating a method for communicating information associated with a handoff of a wireless device from a source network to a target network.

FIG. 7 shows an example illustrating a method for enhanced non-optimized handoff of a wireless device from a source network to a target network. The method shown in FIG. 7 may be implemented by one or more of the devices described herein. For example, the method shown in FIG. 7 may be implemented in an access point.

At block 702, a unique identifier associated with a device is received from the device operating on a first radio access system of a first network. In some implementations, a STA may transmit an encapsulated unique identifier that may be used to identify context information on another network. The unique identifier may be included in a vendor specific network control protocol message. The unique identifier may include a context identifier and the radio access technology that issued the context identifier. Examples of unique identifiers include a globally unique temporary identity (GUTI), a simplified tracking area update (TAU) request with mandatory fields required by the old MME, or an old TAU request.

At block 704, a context is fetched for the device based in part on the unique identifier from a second radio access system of a second network. In an implementation where handoff is from an LTE network to eHRPD network, the HSGW of the eHRPD may be configured to fetch the context from the MME of the LTE network based at least in part on the unique identifier. In some implementations, the fetching may include identifying the MME based on the unique identifier, such as identifying the radio access technology issuing the context identifier. In some implementations, this identification may include looking up the information in, for example, memory or by backhaul message exchanges. Once the MME has been identified, the unique identifier may be sent to the MME from the HSGW to fetch the context for the associated device. For example, as described above in FIG. 5, a context request message may be used to request the context transfer.

At block 706, a context is generated for the device based on the context fetched from the second radio access system. The generation of the context may include translating the context from a format used by the second radio system into a format suitable for processing on the first radio system. Accordingly, the system may not contact the home subscriber service for the device to retrieve the context but rather fetch the context from the old MME. This may enhance the non-optimized handoff by reducing the amount of signaling used to retrieve the context. For instance, the eHRPD may be closer to the old MME than the HSS. Accordingly the distance a signal may need to travel to retrieve the context is reduced. Furthermore, the communication may require fewer intermediate transmission as the HSGW may communicate directly with the old MME. Each of these enhancements may reduce the time to complete the handoff.

In some implementations, generating the context may involve translating information included in the context fetched to generate the context. For example, the processor may be configured to first identify the old MME radio access system. Based on old MME radio access system, a mapping between a context for the old MME radio access system to the current radio access system may be identified. The mapping may be stored in memory coupled with the device. Once the context is received from the old MME, the processor may be configured to apply the identified mapping from the old MME context to the current context. In some implementations, the mapping may include calculating a value for the current context based on information included in one or more fields of the old MME context. In some implementations, the mapping may include translating a value for the current context based on information included in one or more fields of the old MME context.

Figure 8:
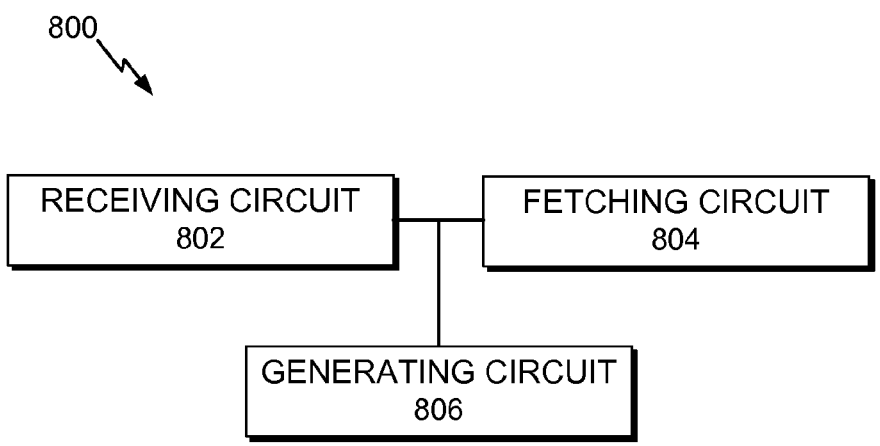
FIG. 8 shows a functional block diagram of another wireless communication device.

FIG. 8 shows a functional block diagram of another wireless communication device. Those skilled in the art will appreciate that a wireless communication device may have more components than the simplified wireless communication device 800 shown in FIG. 8. The wireless communication device 800 shown includes only those components useful for describing some prominent features of implementations within the scope of the claims. The wireless communication device 800 includes a receiving circuit 802, a fetching circuit 804, and a generating circuit 806.

The receiving circuit 802 may be configured to receive a unique identifier associated with a device from the device operating on a first radio access system of a first network. The receiving circuit 802 may include one or more of an antenna, a receiver, and a digital signal processor. In some implementations, the means for receiving may include the receiving circuit 802.

The fetching circuit 804 may be configured to fetch a context for a device based in part on the unique identifier from a second radio access system of a second network The fetching circuit 804 may include one or more of an antenna, a transceiver, and a digital signal processor. In some implementations, the means for fetching may include the fetching circuit 804.

The generating circuit 806 may be configured to generate a context for a device based on the context fetched from the second radio access system. The generating circuit 806 may include one or more of an antenna, a transceiver, and a digital signal processor. In some implementations, the means for fetching may include the generating circuit 806.

Figure 9:
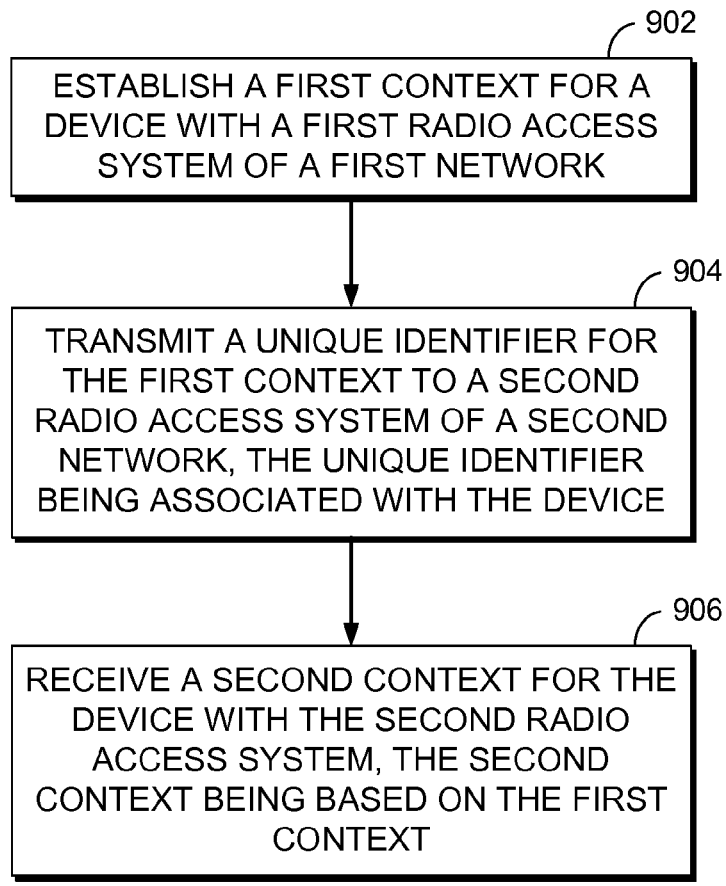
FIG. 9 shows an example illustrating a method for communicating information associated with a handoff of a wireless device from a source network to a target network.

FIG. 9 shows an example illustrating a method for enhanced non-optimized handoff of a wireless device from a source network to a target network. The method shown in FIG. 9 is a complement to the method discussed above in relation to FIG. 7. The method shown in FIG. 9 may be implemented by one or more of the devices described herein. For example, the method shown in FIG. 9 may be implemented in a user equipment.

At block 902, a first context may be established for a device with a first radio access system of a first network. In some implementations, the first radio access system may be an LTE system. At block 904, a unique identifier for the first context may be transmitted to a second radio access system of a second network (e.g., eHRPD). The unique identifier may be associated with the device. For example, as described above, the unique identifier may be information that can be used by the second network to identify a context for the device on the first network. At block 906, a second context is received for the device. The second context may be for the second radio access system. The second context may be based on the first context.

Figure 10:
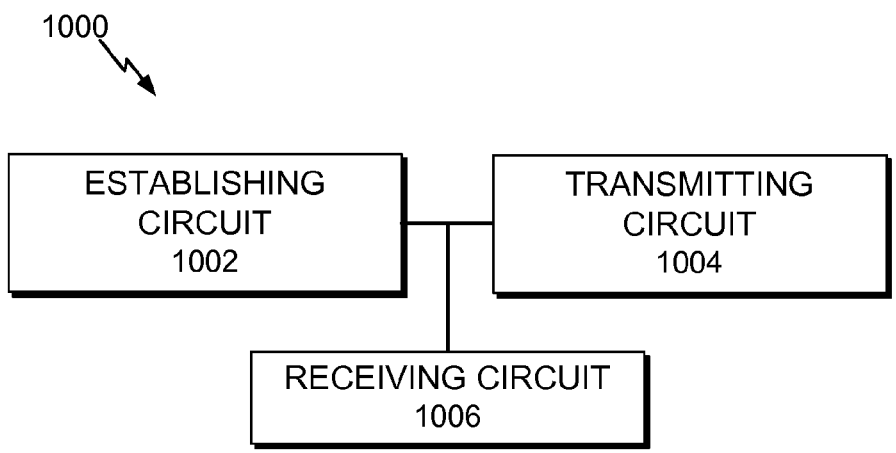
FIG. 10 shows a functional block diagram of another wireless communication device.

FIG. 10 shows a functional block diagram of another wireless communication device. Those skilled in the art will appreciate that a wireless communication device may have more components than the simplified wireless communication device 1000 shown in FIG. 10. The wireless communication device 1000 shown includes only those components useful for describing some prominent features of implementations within the scope of the claims. The wireless communication device 1000 includes an establishing circuit 1002, a transmitting circuit 1004, and a receiving circuit 1006.

The establishing circuit 1002 may be configured to establish a first context for the device with a first radio access system of a first network. The establishing circuit 1002 may include a transceiver, a processor, and an antenna. In some implementations, the means for establishing a context may include the establishing circuit 1002.

In some implementations, the transmitting circuit 1004 may be configured to transmit a unique identifier for the first context to a second radio access system of a second network, the unique identifier being associated with the device. The transmitting circuit 1004 may include a transmitter and an antenna. In some implementations, the means for transmitting may include the transmitting circuit 1004.

Some implementations may include the receiving circuit 1006. The receiving circuit 1006 may be configured to receive a second context for the device with the second radio access system, the second context being based on the first context. The receiving circuit 1006 may include an antenna and a receiver. In some implementations, the means for receiving may include the receiving circuit 1006.

Figure 11:
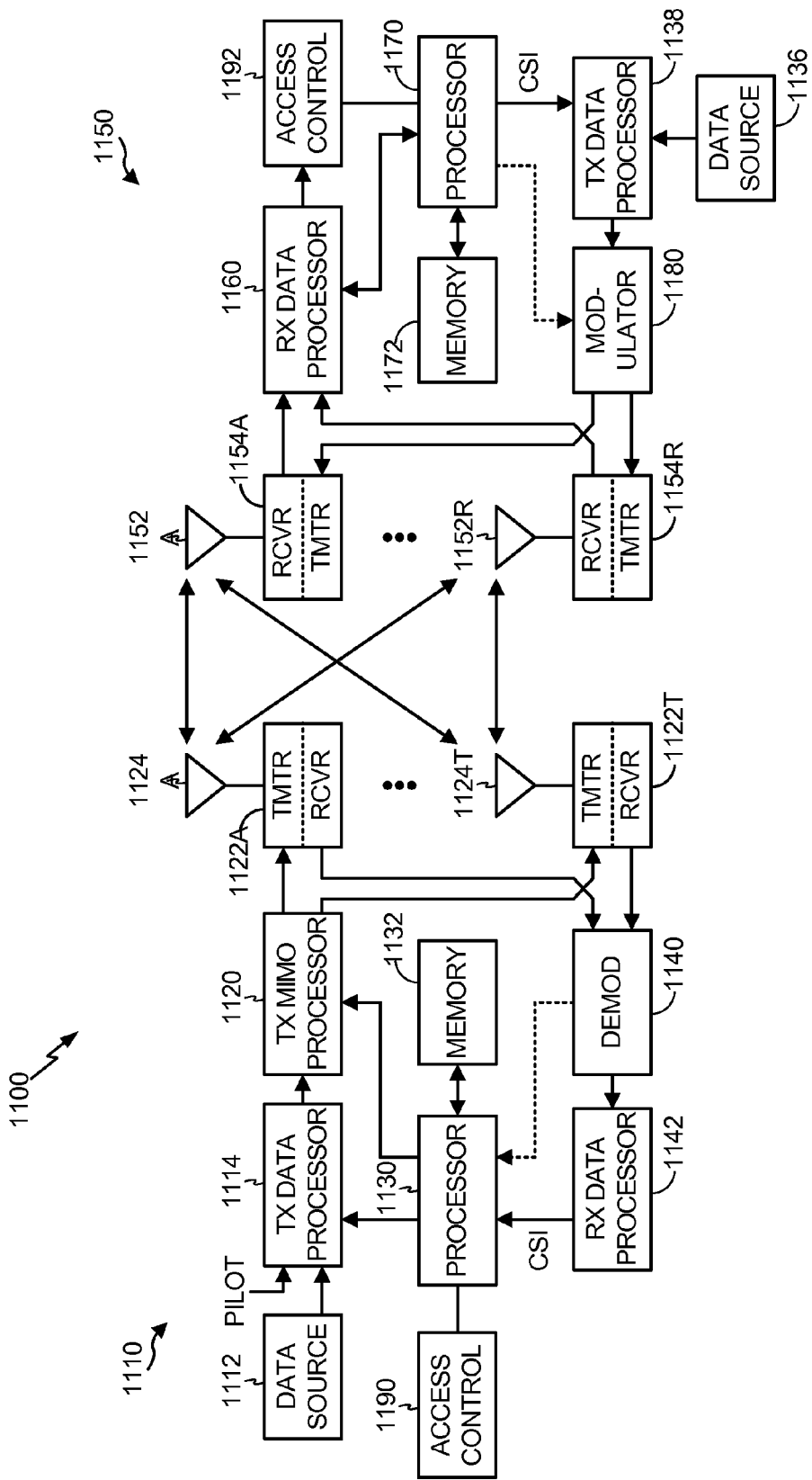
FIG. 11 shows an example of a functional block diagram of various components in a communication system.

FIG. 11 shows an example of a functional block diagram of various components in a communication system. As indicated by the systems and methods described above, the teachings herein may be incorporated into a node (e.g., a device) employing various components for communicating with at least one other node. FIG. 11 depicts several sample components that may be employed to facilitate communication between nodes. Specifically, FIG. 11 is a simplified block diagram of a first wireless device 1110 (e.g., an access point) and a second wireless device 1150 (e.g., an access terminal) of a multiple-in-multiple-out (MIMO) system 1100. At the first device 1110, traffic data for a number of data streams is provided from a data source 1112 to a transmit (TX) data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for the data streams are then provided to a TX MIMO processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and up converts) the analog signals to provide a modulated signal suitable for transmission over the MIMO channel. NT modulated signals from transceivers 1122A through 1122T are then transmitted from NT antennas 1124A through 1124T, respectively.

At the second device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and down converts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the second device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the second device 1150 are received by the antennas 1124, conditioned by the transceivers 1122, demodulated by a demodulator (DEMOD) 1140, and processed by a RX data processor 1142 to extract the reverse link message transmitted by the second device 1150. The processor 1130 then determines which pre-coding matrix to use for determining the beam-forming weights then processes the extracted message.

FIG. 11 also illustrates that the communication components may include one or more components that perform access control operations as taught herein. For example, an access control component 1190 may cooperate with the processor 1130 and/or other components of the device 1110 to send/receive signals to/from another device (e.g., device 1150) as taught herein. Similarly, an access control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the access control component 1190 and the processor 1130 and a single processing component may provide the functionality of the access control component 1192 and the processor 1170. Furthermore, the components of the apparatus 1100 described with reference to FIG. 3 may be incorporated with/into the components of FIG. 11.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of enhanced non-optimized handoff of a device from a first network to a second network in a wireless communication system comprising:

receiving a unique identifier associated with the device from the device operating on a first radio access system of the first network;

fetching context information for the device based in part on the unique identifier from a second radio access system of the second network, wherein fetching comprises transmitting a vendor specific network control protocol (VSNCP) message for requesting the context information for the device from a high rate packet data (HRPD) serving gateway (HSGW) in the second radio access system to mobility management entity (MME) in the first radio access network; and mapping, at the second radio access system, the fetched context information to a context for the device to facilitate the non-optimized handoff of the device to the second network, wherein mapping comprises transforming an attribute of the fetched context information.

2. The method of claim 1, wherein the first radio access system is a different system type than the second radio access system.

3. The method of claim 1, wherein the unique identifier is encapsulated, the encapsulated unique identifier indicating a common capability of the first radio access system and the second radio access system.

4. The method of claim 1, wherein the unique identifier is tunneled.

5. The method of claim 1, wherein fetching the context information comprises intra context transfer for inter-radio access technology (RAT) context transfer.

6. The method of claim 5, wherein the enhanced non-optimized handoff uses an intra LTE context transfer for inter-radio access technology (RAT) context transfer.

7. The method of claim 6, wherein a HRPD serving gateway (HSGW) serving as a mobility management entity (MME) performs the fetching.

8. The method of claim 5, wherein the enhanced non-optimized handoff uses an intra 3GPP context transfer to transfer context information to a non-3GPP radio access technology (RAT).

9. The method of claim 8, wherein a HRPD serving gateway (HSGW) serving as a serving GPRS support node (SGSN) performs the fetching.

10. The method of claim 1, wherein the first network comprises a network configured to use a long term evolution radio access technology, and wherein the second network comprises a network configured to use an evolved high rate packet data radio access technology.

11. A wireless communication apparatus operative for enhanced non-optimized handoff of a device from a first network to a second network in a wireless communication network, the apparatus comprising:

a receiver configured to receive a unique identifier associated with the device from the device operating on a first radio access system of the first network;

a context fetching circuit configured to fetch context information for the device based in part on the unique identifier from a second radio access system of the second network, wherein the context fetching circuit is configured to transmit a vendor specific network control protocol (VSNCP) message for requesting the context information for the device from a high rate packet data (HRPD) serving gateway (HSGW) in the second radio access system to mobility management entity (MME) in the first radio access network; and a context generating circuit configured to map, at the second radio access system, the fetched context information to a context for the device to facilitate the non-optimized handoff of the device to the second network, wherein context generating circuit is configured to map the fetched context information to the context by transforming an attribute of the fetched context information.

12. The wireless communication apparatus of claim 11, wherein the first radio access system is a different system type than the second radio access system.

13. The wireless communication apparatus of claim 11, wherein the unique identifier is encapsulated, the encapsulated unique identifier indicating a common capability of the first radio access system and the second radio access system.

14. The wireless communication apparatus of claim 11, wherein the unique identifier is tunneled.

15. The wireless communication apparatus of claim 11, wherein fetching the context information comprises intra context transfer for inter-radio access technology (RAT) context transfer.

16. The wireless communication apparatus of claim 15, the enhanced non-optimized handoff uses an intra LTE context transfer for inter-radio access technology (RAT) context transfer.

17. The wireless communication apparatus of claim 16, wherein the context fetching circuit comprises a HRPD serving gateway (HSGW) serving as a mobility management entity (MME).

18. The wireless communication apparatus of claim 11, wherein the first network comprises a network configured to use a long term evolution radio access technology, and wherein the second network comprises a network configured to use an evolved high rate packet data radio access technology.

19. A wireless communication apparatus operative for enhanced non-optimized handoff of a device from a first network to a second network in a wireless communication network, the apparatus comprising:

means for receiving a unique identifier associated with the device from the device operating on a first radio access system of the first network;

means for fetching context information for the device based in part on the unique identifier from a second radio access system of the second network, wherein the means for fetching comprises means for transmitting a vendor specific network control protocol (VSNCP) message for requesting the context information for the device from a high rate packet data (HRPD) serving gateway (HSGW) in the second radio access system to mobility management entity (MME) in the first radio access network; and means for mapping, at the second radio access system, the fetched context information to a context for the device to facilitate the non-optimized handoff of the device to the second network, wherein the means for mapping comprises means for transforming an attribute of the fetched context information.

20. The wireless communication apparatus of claim 19, wherein the means for receiving comprise an antenna and a receiver, wherein the means for mapping context information comprise a processor and a transceiver, and wherein the means for generating a context comprise a processor and a memory.

21. A computer program product, comprising:
a non-transitory computer-readable medium including:
code for causing a computer to receive a unique identifier associated with a device from the device operating on a first radio access system of a first network;
code for causing a computer to fetch context information for the device based in part on the unique identifier from a second radio access system of a second network, wherein the computer fetches by transmitting a vendor specific network control protocol (VSNCP) message for requesting the context information for the device from a high rate packet data (HRPD) serving gateway (HSGW) in the second radio access system to mobility management entity (MME) in the first radio access network; and code for causing a computer to map, at the second radio access system, the fetched context information to a context for the device to facilitate a non-optimized handoff of the device to the second network, wherein the computer maps by transforming an attribute of the fetched context information.

22. A method of enhanced non-optimized handoff of a device from a first network to a second network in a wireless communication system comprising:

establishing a first context for the device with a first radio access system of the first network;

transmitting a unique identifier for the first context to a second radio access system of the second network, the unique identifier being associated with the device; and receiving a second context for the device based in part on the unique identifier with the second radio access system, the second context being mapped, at the second radio access system, based on a transmission of a vendor specific network control protocol (VSNCP) message for requesting the second context for the device from a high rate packet data (HRPD) serving gateway (HSGW) in the second radio access system to mobility management entity (MME) in the first radio access network and a transformation of an attribute of the second context to facilitate the non-optimized handoff of the device to the second network.

23. The method of claim 22, wherein the first radio access system is a different system type than the second radio access system.

24. The method of claim 22, wherein the unique identifier is encapsulated, the encapsulated unique identifier indicating a common capability of the first radio access system and the second radio access system.

25. The method of claim 22, wherein the unique identifier is tunneled.

26. The method of claim 22, wherein transmitting the unique identifier comprises transmitting the unique identifier in another VSNCP message.

27. The method of claim 22, wherein the first network comprises a network configured to use a long term evolution radio access technology, and wherein the second network comprises a network configured to use an evolved high rate packet data radio access technology.

28. A wireless communication device operative for enhanced non-optimized handoff of the device from a first network to a second network in a wireless communication network, the device comprising:

a context establishment circuit configured to establish a first context for the device with a first radio access system of the first network;

a transmitter configured to transmit a unique identifier for the first context to a second radio access system of the second network, the unique identifier being associated with the device; and a receiver configured to receive a second context for the device based in part on the unique identifier with the second radio access system, the second context being mapped, at the second radio access system, based on a transmission of a vendor specific network control protocol (VSNCP) message for requesting the second context for the device from a high rate packet data (HRPD) serving gateway (HSGW) in the second radio access system to mobility management entity (MME) in the first radio access network and a transformation of an attribute of the second context to facilitate the non-optimized handoff of the device to the second network.

29. The device of claim 28, wherein the first radio access system is a different system type than the second radio access system.

30. The device of claim 28, wherein the unique identifier is encapsulated, the encapsulated unique identifier indicating a common capability of the first radio access system and the second radio access system.

31. The device of claim 28, wherein the unique identifier is tunneled.

32. The device of claim 28, wherein the transmitter is configured to transmit the unique identifier in a another VSNCP message.

33. The device of claim 28, wherein the first network comprises a network configured to use a long term evolution radio access technology, and wherein the second network comprises a network configured to use an evolved high rate packet data radio access technology.

34. A wireless communication device operative for enhanced non-optimized handoff of the device from a first network to a second network in a wireless communication network, the device comprising:

means for establishing a first context for the device with a first radio access system of the first network;

means for transmitting a unique identifier for the first context to a second radio access system of the second network, the unique identifier being associated with the device; and means for receiving a second context for the device based in part on the unique identifier with the second radio access system, the second context being mapped, at the second radio access system, based on a transmission of a vendor specific network control protocol (VSNCP) message for requesting the second context for the device from a high rate packet data (HRPD) serving gateway (HSGW) in the second radio access system to mobility management entity (MME) in the first radio access network and a transformation of an attribute of the second context to facilitate the non-optimized handoff of the device to the second network.

35. The device of claim 34, wherein the means for establishing a context comprise a transceiver and a processor, wherein the means for transmitting comprise antenna and a transmitter, and wherein the means for receiving comprise a receiver and an antenna.

36. A computer program product, comprising:

a non-transitory computer-readable medium including:

code for causing a computer to establish a first context for a device with a first radio access system of a first network;

code for causing a computer to transmit a unique identifier for the first context to a second radio access system of a second network, the unique identifier being associated with the device; and code for causing a computer to receive a second context for the device based in part on the unique identifier with the second radio access system, the second context being mapped at the second radio access system, based on a transmission of a vendor specific network control protocol (VSNCP) message for requesting the second context for the device from a high rate packet data (HRPD) serving gateway (HSGW) in the second radio access system to mobility management entity (MME) in the first radio access network and a transformation of an attribute of the second context to facilitate a non-optimized handoff of the device to the second network.

\* \* \* \* \*